US012798701B2

(12) United States Patent
Franck

(10) Patent No.: US 12,798,701 B2
(45) Date of Patent: Nov. 17, 2026

(54) SEGMENTED COMPOSITE RUBBER TRACK SOLUTION

(71) Applicant: Loc Performance Products LLC, Plymouth, MI (US)

(72) Inventor: Randall L Franck, Berne, IN (US)

(73) Assignee: Loc Performance Products, LLC, Plymouth, MI (US)

( * ) Notice: Subject to any disclaimer, the term of this patent is extended or adjusted under 35 U.S.C. 154(b) by 158 days.

(21) Appl. No.: 18/886,240

(22) Filed: Sep. 16, 2024

(65) Prior Publication Data

US 2026/0077828 A1 Mar. 19, 2026

Related U.S. Application Data

(63) Continuation-in-part of application No. 17/625,638, filed as application No. PCT/EP2020/070394 on Jul. 17, 2020, now abandoned.

(60) Provisional application No. 62/876,053, filed on Jul. 19, 2019.

(51) Int. Cl.
*B62D 55/21* (2006.01)
*B62D 55/24* (2006.01)
*B62D 55/32* (2006.01)

(52) U.S. Cl.
CPC ............ *B62D 55/21* (2013.01); *B62D 55/24* (2013.01); *B62D 55/32* (2013.01)

(58) Field of Classification Search
CPC ...... B62D 55/21; B62D 55/24; B62D 55/253; B62D 55/32
See application file for complete search history.

(56) References Cited

U.S. PATENT DOCUMENTS

| | | | |
|---|---|---|---|
| 2,402,042 | A | 6/1946 | Haushalter |
| 3,544,174 | A | 12/1970 | Giacosa |
| 3,734,576 | A | 5/1973 | Heiple et al. |
| 4,195,887 | A | 4/1980 | Ruddell |
| 2011/0037313 | A1 | 2/2011 | Delisle |

FOREIGN PATENT DOCUMENTS

| | | | | | |
|---|---|---|---|---|---|
| EP | 2275325 | A2 | | 1/2011 | |
| GB | 2152885 | | | 8/1985 | |
| GB | 2152885 | A | | 8/1985 | |
| GB | 2436095 | A | * | 9/2007 | ............ B62D 55/21 |
| JP | S5499233 | U | | 7/1979 | |
| WO | 2012/142705 | A1 | | 5/1973 | |
| WO | WO2012142405 | A1 | | 10/2012 | |

OTHER PUBLICATIONS

Canadian Intellectual Property Office—Examination Requisition for CA Application No. 3147859, dated Aug. 26, 2025.
Purusant to ARticle 94(3) EPC in related case.
Examination Report No. 1 from Australian Patent Office in a related matter.

* cited by examiner

*Primary Examiner* — Kip T Kotter
(74) *Attorney, Agent, or Firm* — Panagos Kennedy PLLC; Speros B. Panagos; Bill C. Panagos

(57) ABSTRACT

A segmented rubber track having a plurality of rubber track segments is disclosed. The rubber track segments include first and second ends that include rubber bushings through which a connecting pin is inserted. The connecting pin connects one rubber track segment to another rubber track segment.

13 Claims, 7 Drawing Sheets

WIRE-PLY CONSTRUCTION

SEGMENTED COMPOSITE RUBBER TRACK SOLUTION

PRIORITY CLAIM

This application is a continuation-in-part application of and thus claims priority to co-pending U.S. patent application Ser. No. 17/625,638, filed May 20, 2022, which is National Stage application which claim benefit of International patent Application No. PCT/EP2020/070394, filed Jul. 17, 2020, which claims priority benefit from U.S. Ser. No. 62/876,053 filed Jul. 19, 2019, the contents of all of which are incorporated herein in their entireties.

FIELD

The field to which the disclosure generally relates is vehicle tracks, and more particularly to segmented vehicle tracks.

BACKGROUND

Continuous tracks are widely used in vehicles, such as agricultural vehicles and the like. The continuous tracks rotate around wheels, pulleys and the like to propel/move the vehicle across various types of terrain.

A continuous track can be damaged during operation. The track can be damaged by rocks, elements, temperature and the like.

Once the continuous track is damaged, the vehicle can be disabled and immobilized. To repair the vehicle, a replacement continuous track is sent to the disabled vehicle location and installed at great cost of time and material.

What is needed are techniques to repair continuous tracks with less time and cost.

DETAILED DESCRIPTION

Figure 1:
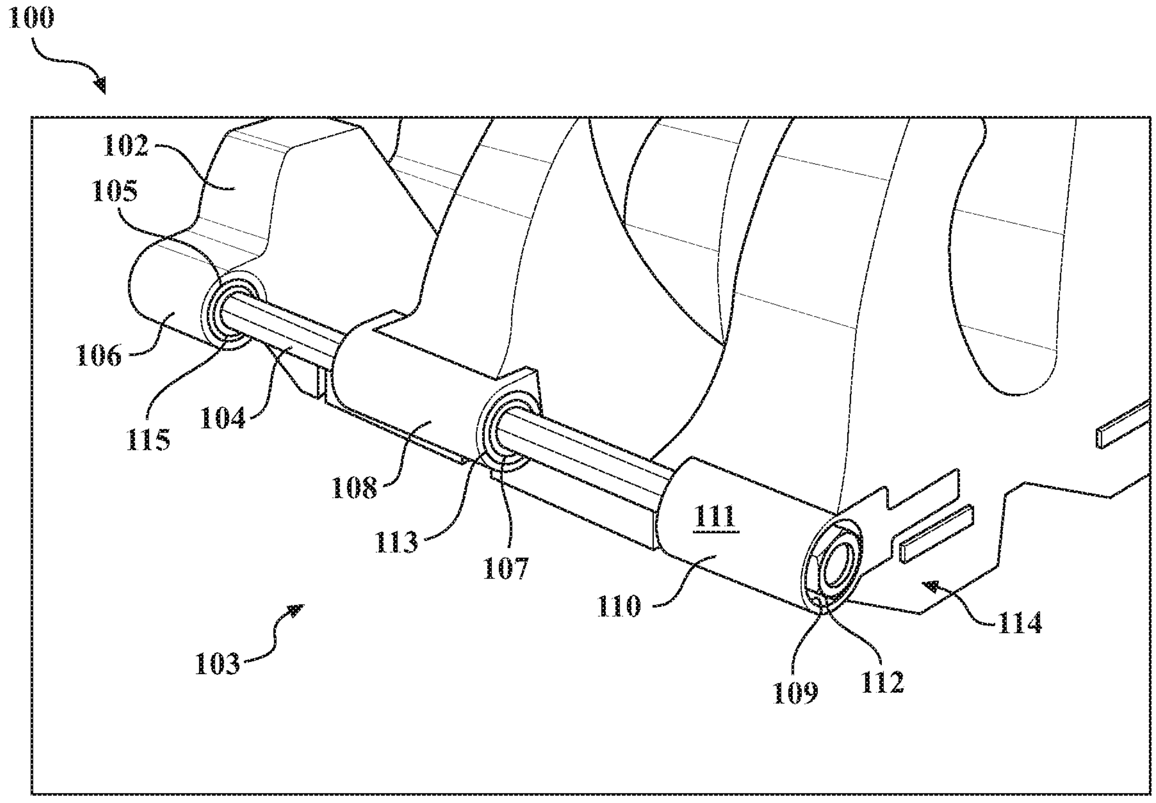
FIG. 1 is a diagram illustrating a portion of a rubber track segment 100 in accordance with one or more embodiments.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a range or dimension listed or described as being useful, suitable, or the like, is intended that any and every value or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Continuous tracks are widely used in vehicles, such as agricultural vehicles and the like. The continuous tracks rotate around wheels, pulleys and the like to propel/move the vehicle across various types of terrain.

A continuous track can be damaged during operation. The track can be damaged by rocks, elements, temperature and the like.

Once the continuous track is damaged, the vehicle can be disabled and immobilized. To repair the vehicle, a replacement continuous track is sent to the disabled vehicle location and installed at great cost of time and material.

What is needed are techniques to repair continuous tracks with less time and cost.

One or more embodiments are disclosed that facilitate repair by using a continuous track comprised of replaceable track segments.

Embodiments according to the disclosure can include tracks which generally include a body having an outer surface displaying a series of ground engaging profiles longitudinally spaced along the outer surface and formed of an elastomeric material, and an inner surface formed of a urethane reinforcement material, such as a castable urethane material, where the inner surface includes a series of longitudinally spaced guide-drive lugs for retaining the track on the vehicle and/or driving the vehicle.

As used in this detailed description, the phrase "elastomeric material" means a material comprising at least one elastomer that can be reinforced with at least one filler such as carbon black, which may be a natural rubber or synthetic rubber, such as emulsion styrene-butadiene rubber, solution styrene-butadiene rubber, synthetic polyisoprene rubber, polybutadiene rubber, or a blend of natural and synthetic rubbers. Such elastomeric materials may also be mixed with other materials, such silica, clay, organic fiber, inorganic metal powder, mineral powder, talc, calcium sulfate, calcium silicate, distillates, curatives, accelerators, activators, processing aids, antioxidant packages, pigments, and the like.

The phrase "castable urethane material" means polyurethane forming material(s) used in a method of casting where a mold is filled with a liquid synthetic polymer, which then hardens. In some embodiments according to the disclosure, casting may be accomplished with the liquid polymer plus an effective amount of a "hardener" liquid, which functionally contains a second polymer or reactant, for use in forming a final product which is a copolymer. Copolymers contain two different alternating chemical entities in the final polymer molecule. For example, in a polyurethane casting process, the polyurethane polymer structure may be formed by reacting a di- or polyisocyanate with a polyol or polyamine. Nonlimiting examples of such materials include DURACAST® C930 MDI-terminated polycaprolactone prepolymer reacted with DURACURE™ C3-LF (4,4'-diaminodiphenylmethane), both available from Chemtura Corporation, Philadelphia, PA.

The isocyanates and polyols or polyamines used to make polyurethanes may in some aspects contain on average two or more functional groups per molecule. The materials are mixed, introduced into the mold, and exposed to certain conditions (i.e. temperature, time, pressure, etc.) to form the polyurethane polymer structure or body. In some aspects, the casted urethane materials are prepared by a low pressure casting process where pressure within an empty mold is sufficiently reduced, and low pressure is used to transfer the reaction components into the empty mold, which then react and cast the structure. In some other aspects, the structure are formed using a compression mold process which does not involve lowering pressure in the mold, but rather, high pressure is used to transfer the reaction components into the empty mold, and sufficient forces are placed on the components in the formation of the structure in the mold. In yet other embodiments, the casturethane materials are prepared by pouring the reactants into a mold, and allowing the structure to form under suitable conditions.

In some cases, the polyurethane structure is first cast by combining and reacting the polyisocyanate and polyol or polyamine components, and then the structure combined with the elastomeric material and other reinforcement components to form a track. Sufficient heat and/or pressure may be provided to vulcanize or otherwise cure the track. Such heat and/or pressure may also be suitable to promote sufficient bonding of the cast urethane structure, elastomeric material and reinforcement components.

The castable urethane material(s) may also be mixed with various additives in conventional or suitable amounts known to persons having ordinary skill in the art. Such additives may include, and are not limited to, cross-linking agents, accelerators, retardants to prevent an unduly quick cure, antioxidants, aging resistance aids (e.g., ozone and UV resistance), adhesion promoters, processing aids, flame retardancy additives, reinforcing agents and fillers, such as carbon black, silica, other mineral fillers, lignin, fibers, friction modifiers such as ultra-high molecular weight polyethylene (UHMWPE), polytetrafluoroethylene (PTFE), and the like. In some cases, carbon black, silver salts, or any other suitable electrically conductive materials may also be added to control and/or reduce static electricity buildup. Reinforcing fillers are typically utilized at a level which is within the range of about 50 parts per hundred parts of resin (phr) to about 150 phr.

It is appreciated that segmented (metallic) track can be used for the US Government applications and rubber composite track for Agriculture and Industrial applications. Generally, rubber track is considered continuous as there is no beginning or end of the product, it is one continuous loop. Segmented metallic track typically included individual pitches joined together by attaching hardware to form a continuous loop as installed on the vehicle.

It is also appreciated that tracks can be damaged and require repair and/or replacement. Generally, continuous rubber track is replaced when damaged. Unlike a metallic track where a single, or multiple pitches can be replaced, creating a functional track. A continuous track must be replaced. There is no suitable repair procedure for damage to structural reinforcement.

Some techniques exist to repair rubber tracks. One technique is to use a temporary band-aid to temporarily repair a track allowing the vehicle to return to travel to a repair facility where the entire rubber track is replaced. Other techniques include use of hardware and plates to join repair/replacement sections.

One or more embodiments are disclosed that include segmented rubber tracks that allow repair or replacement of segments of a rubber track. The embodiments include a joining mechanism and joining method to assemble a rubber track segment to other rubber track. Further, the mechanism and segments provide radial and rotational compliance for less noise and vibration.

Further, the rubber track segments allow a continuous/overall rubber track to be manufactured in smaller sections, segments, or pitches, and joined together to form a continuous track. This way, when a section of track is damaged, the damaged section or pitch can be removed and replaced to form a fully functional continuous track again. The embodiments include the use of rubber bushings, an octagonal pin, and attaching nuts to join sections together quickly and easily, while providing a more robust and longer lasting segmented track.

FIG. 1 is a diagram illustrating a portion of a rubber track segment 100 in accordance with one or more embodiments. It is appreciated that the diagram is provided for illustrative purposes and the suitable variations are contemplated.

The rubber track segment 100 is shown having connecting end 114 and a rubber track 102. The segment 100 can also be referred to as a section, pitch and the like. In one example, the rubber track 102 is a composite track that includes rubber, steel, fabric, wire, and/or the like.

The rubber track segment 100 can be connected with one or more other rubber track segments to form an overall or continuous track for a vehicle. The vehicle can be industrial, such as for agriculture use. Additionally, the vehicle can be used for government use. Other applications and uses are contemplated.

The rubber track segment 100 also includes another connecting end, which is not shown and is substantially similar to the connecting end 114. The connecting end 114 and the another connecting end connect or join the segment 100 with the one or more other rubber track segments.

The continuous track, which includes the segment 100, generally weighs less, reduces fuel consumption, is quieter, and mitigates vibration compared with typical steel tracks.

The connecting end 114 can also be referred to as a shoe, track shoe, joining mechanism and the like. The connecting end 114 includes a body portion 103. The connecting end 114 includes a knuckle mechanism 111 through which a connecting pin 104 is inserted to join the end 114 with a second connecting end from another rubber track segment. The knuckle mechanism 111 includes shorter outer sections 106 and 110 and a longer middle section 108. The knuckle mechanism 111 includes eyelets or holes 113 and 115 through which the connecting pin 104 passes through. The second connecting end includes two middle sections (not shown) through which the connecting pin 104 passes through. It is appreciated that suitable variations of the connecting end 114 and the knuckle mechanism 111 are contemplated.

The connecting pin 104 is shown having an octagonal shape, however it is appreciated that round shapes, other geometric shapes and the like are contemplated. The connecting pin 104 is also referred to as a track shoe pin.

The sections 106, 108 and 110 comprise an outer shell, a rubber bushing inside the outer shell and a sleeve inside the rubber bushing. The outer shell is comprised of a suitable material, such as steel or metal. The rubber bushing fits within the outer shell. In this example, there is a longer rubber bushing for the middle section 108 and shorter rubber bushing for the sections 106 and 110. The sleeve fits inside the rubber bushing and has an inner surface that matches or mates with the connecting pin 104. A cap 112 is attached to an outside of the second 110 and secures or holds the connecting pin 104 in the knuckle 111. In one example, the cap 112 is a hex nut.

FIG. 1 shows the end of the track in which the bushings are inserted into the knuckles. The bushings provide flexibility of the track and at the same time provide for detachability of adjacent ends, to provide a flexible track of the band or cable reinforcement type with a resilient oscillating joint, to provide close anchorage of flexible tension members at the joint, to provide cushioning of the track load and flexibility at the joint, and to provide for convenience of assemble and dis-assembly of the track.

In one example, the rubber bushings are bonded and/or formed on outer surfaces of the sleeves. The sleeves can be formed from a tube and machined to a selected shape, such as octagonal.

In operation, a damaged rubber track segment, such as or similar to the segment 100, can be removed by removing the hex nut and removing connecting pins from both ends of the damaged segment. A replacement segment, such as or similar to the segment 100, and be installed by aligning the connecting ends of the segments with each other and inserting connecting pins.

As a result, a continuous track can be repaired and/or upgraded without removing the entire continuous track.

In one example, a continuous track comprises six (6) rubber track segments 100. In another example, a continuous track comprises three (3) rubber track segments. It is appreciated that the length of the continuous track, length of the rubber track segments, and the number of rubber track segments can vary.

Figure 2:
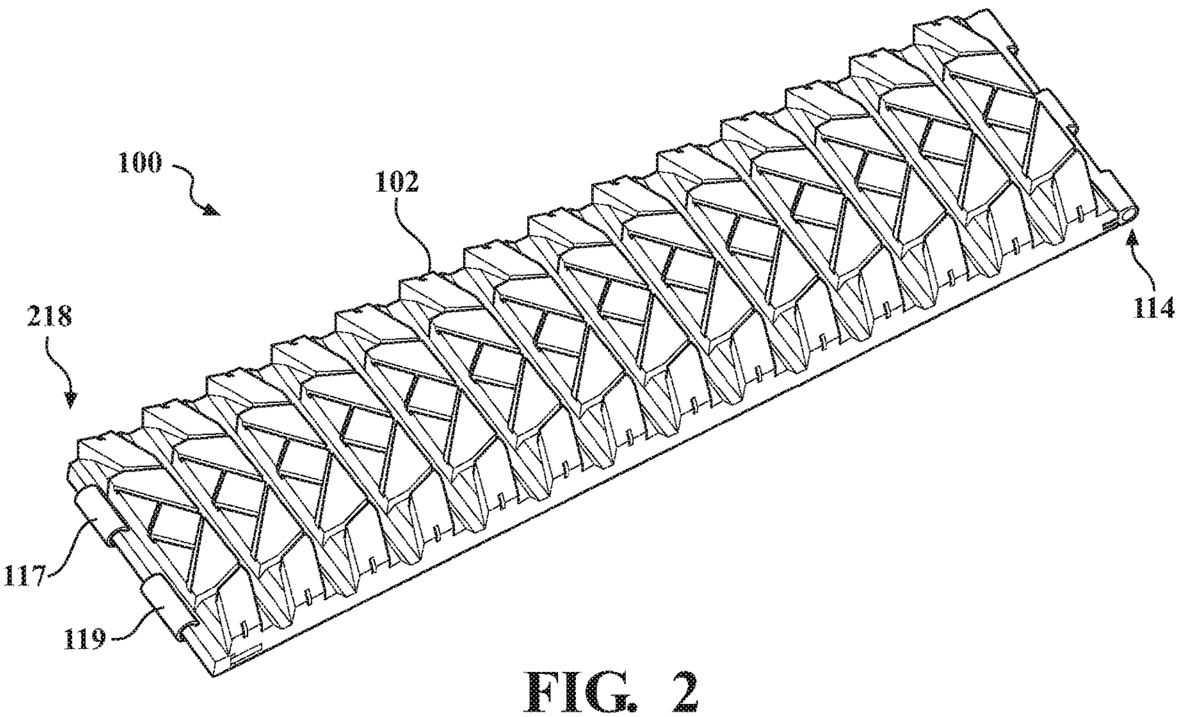
FIG. 2 is a diagram illustrating an outer view of the rubber track segment 100 in accordance with one or more embodiments.

FIG. 2 is a diagram illustrating an outer view of the rubber track segment 100 in accordance with one or more embodiments. It is appreciated that the diagram is provided for illustrative purposes and the suitable variations are contemplated.

Here, the segment 100 is shown with the connecting end 114 and another connecting end 218. The connecting end 218 is substantially similar to the end 114, however it includes two middle sections as shown. The connecting end 218 further includes two outer sections 117 and 119. It is appreciated that suitable variations of the ends 114 and 218 are contemplated that facilitate and/or join the segment 100 to one or more other rubber track segments.

Figure 3:
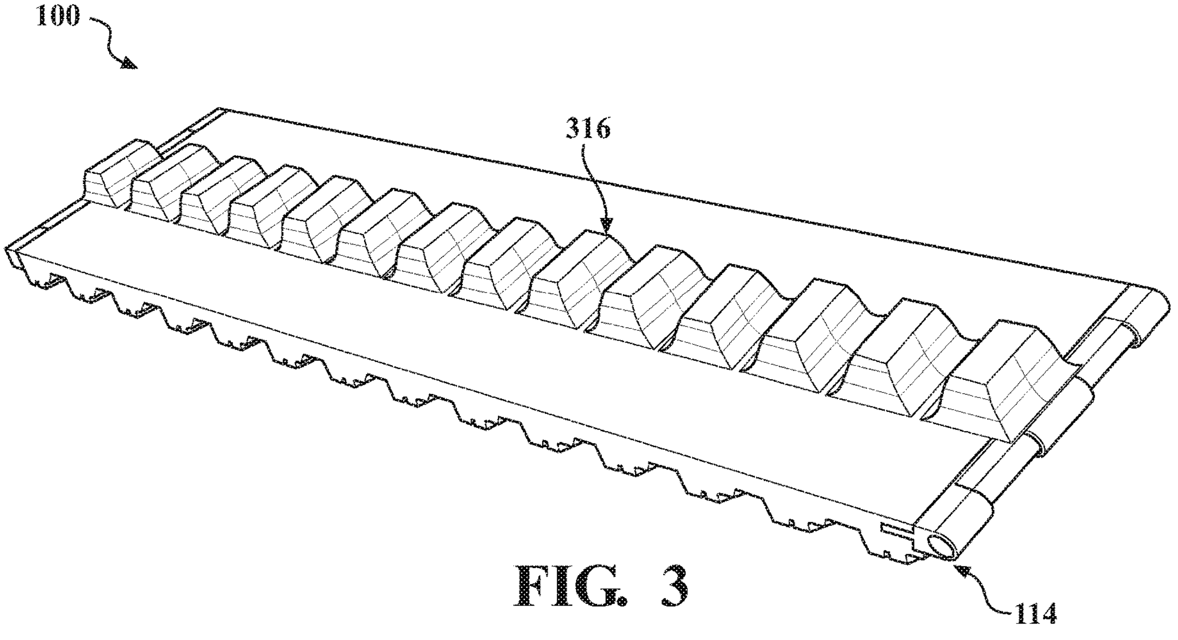
FIG. 3 is a diagram illustrating an inside view of the rubber track segment 100 in accordance with one or more embodiments.

FIG. 3 is a diagram illustrating an inside view of the rubber track segment 100 in accordance with one or more embodiments. It is appreciated that the diagram is provided for illustrative purposes and the suitable variations are contemplated.

Here, the segment 100 is shown having protrusions or lugs 316 that facilitate movement or rotation of the track, thereby facilitating movement of the vehicle.

Figure 4:
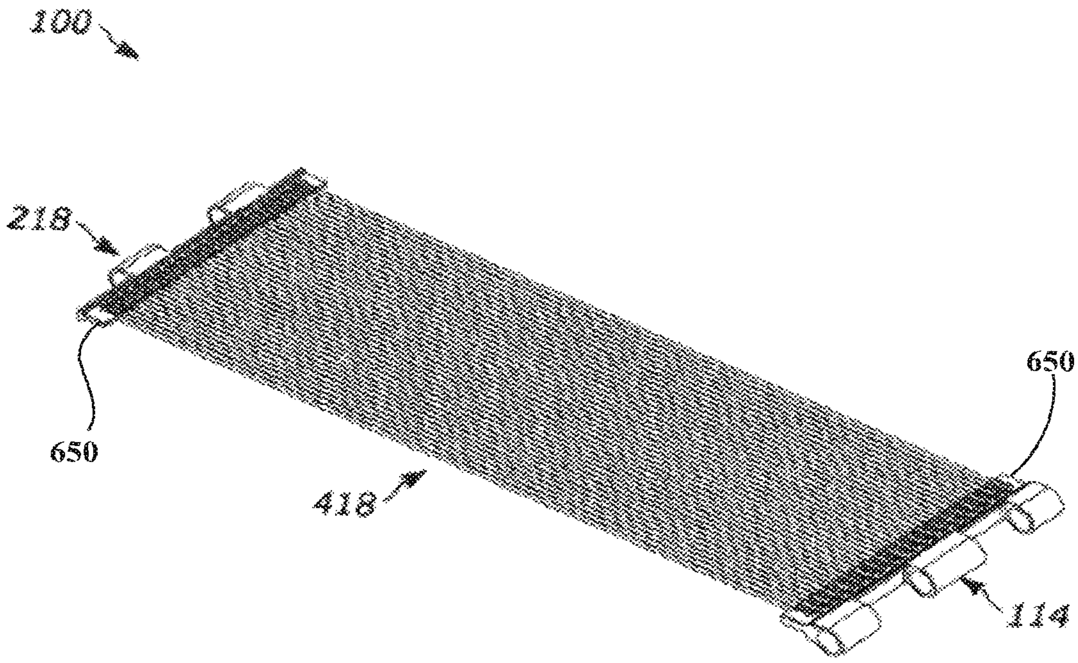
FIG. 4 is an interior view of the rubber track segment 100 in accordance with one or more embodiments.

FIG. 4 is an interior view of the rubber track segment 100 in accordance with one or more embodiments. It is appreciated that the diagram is provided for illustrative purposes and the suitable variations are contemplated.

The segment 100 includes a plurality of metallic or steel cables 418 that extend from one end 114 to the other end 218. The cables 418 are also referred to as reinforcement cables.

The cables 418 are resistant to stretching and prevent or mitigate deformation of the rubber track 102.

The number of cables used can vary based on strength and the like.

Figure 5:
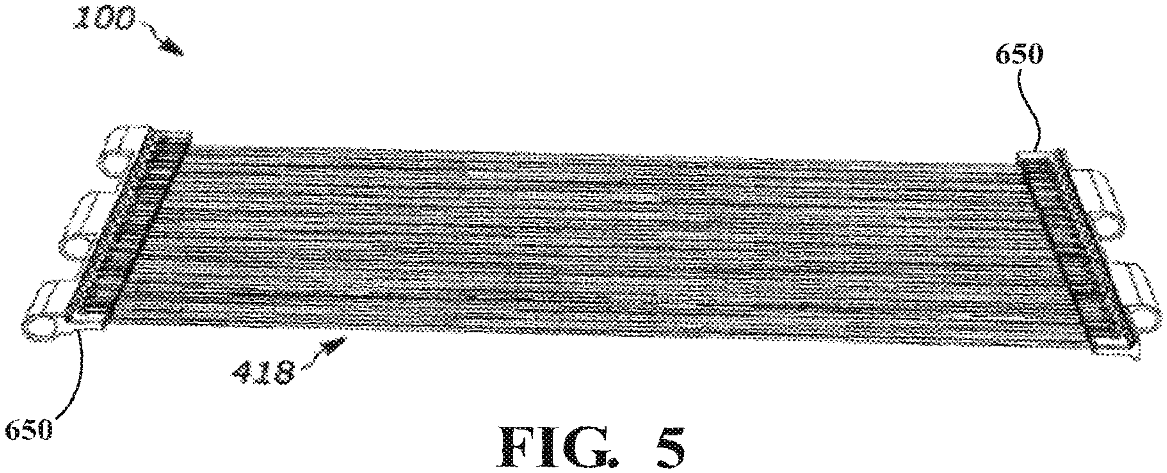
FIG. 5 is another interior view of the rubber track segment 100 in accordance with one or more embodiments.

FIG. 5 is another interior view of the rubber track segment 100 in accordance with one or more embodiments. It is appreciated that the diagram is provided for illustrative purposes and the suitable variations are contemplated.

Figure 6:
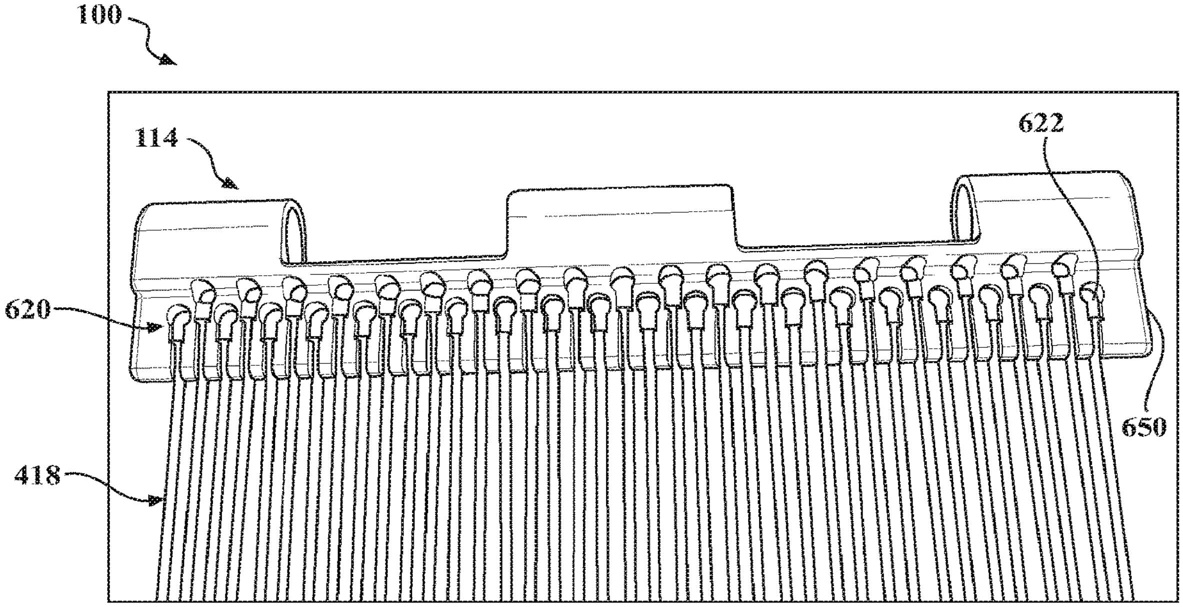
FIG. 6 is a diagram illustrating attachment of the cables 418 at the end 114 in accordance with one or more embodiments.

FIG. 6 is a diagram illustrating attachment of the cables 418 at the end 114 in accordance with one or more embodiments. It is appreciated that the diagram is provided for illustrative purposes and the suitable variations are contemplated.

Each cable end includes a head 622 that is inserted or placed within a hole or insertion points 620 formed in a connector bar 650 of the connecting ends 114 and 128. In this example, there are two rows of holes or insertion points. The head can also be a shank ball or anchor.

The head is attached to a cable by a suitable mechanism, such as crimping. In one example, a ferrule is crimped to the cable to secure the cable to the head or anchor.

Figure 7:
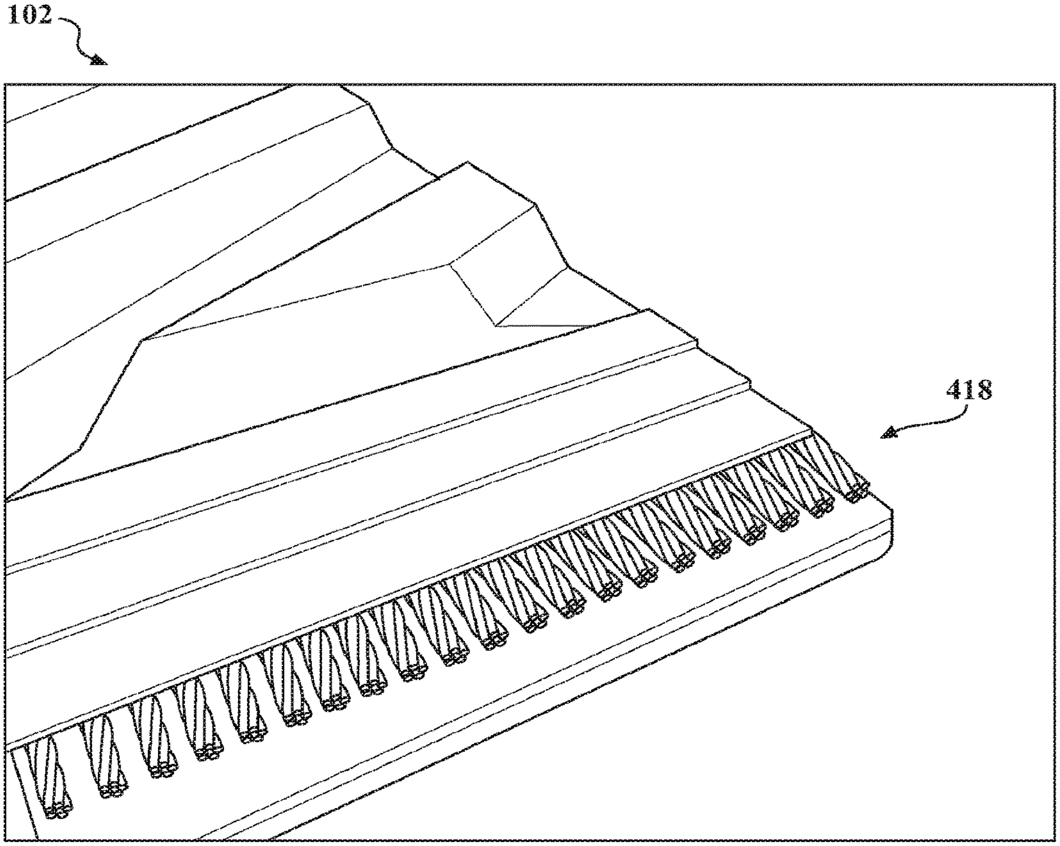
FIG. 7 is a diagram illustrating the rubber track 102 for the segment 100 in accordance with one or more embodiments.

FIG. 7 is a diagram illustrating the rubber track 102 for the segment 100 in accordance with one or more embodiments. It is appreciated that the diagram is provided for illustrative purposes and the suitable variations are contemplated.

The track 102 is shown here as a composite of rubber material, cables 418 and the like.

Figure 8A:
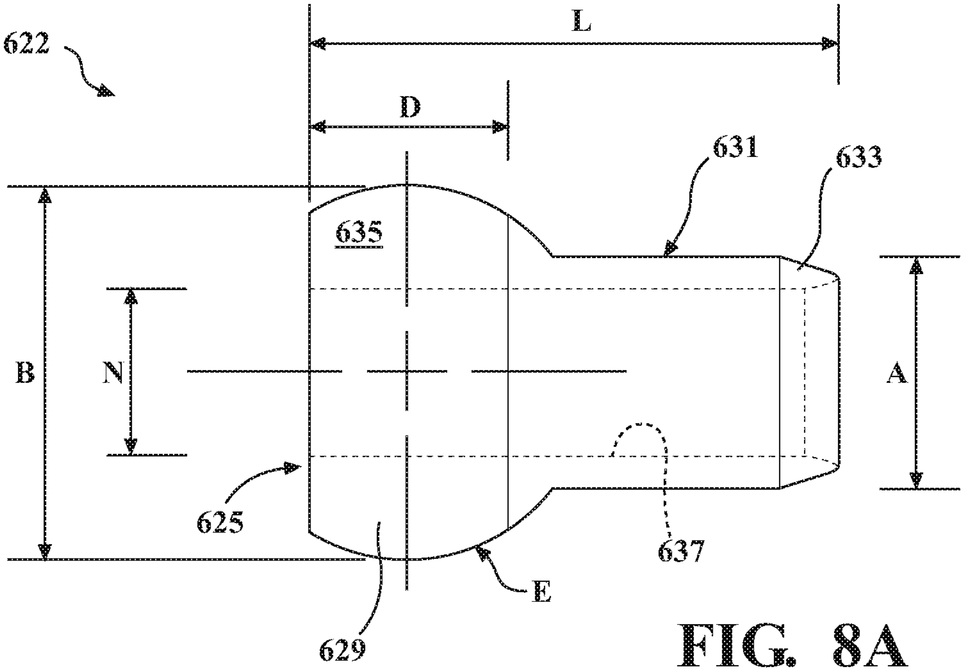
FIG. 8A is a diagram of a suitable head/anchor 622 shape for the cables 418 in accordance with one or more embodiments.

FIG. 8A is a diagram of a suitable head/anchor 622 shape for the cables 418 in accordance with one or more embodiments. The head 622 shown is an example and is provided for illustrative purposes and the suitable variations are contemplated. The head/anchor has a length L and a width B. At a first end 625, the anchor has a profile portion 629 having arc portions E extending from the front end to the tail portion 631. The head has an engagement portion 635 which extends a distance D to interact with the insertion point of FIG. 10 as will be hereinafter explained. The tail portion has a taper 633 which reduces the diameter A of the tail portion. A channel 637 extends the length L and has a diameter N sufficient to permit insertion of a cable therein.

Figure 8B:
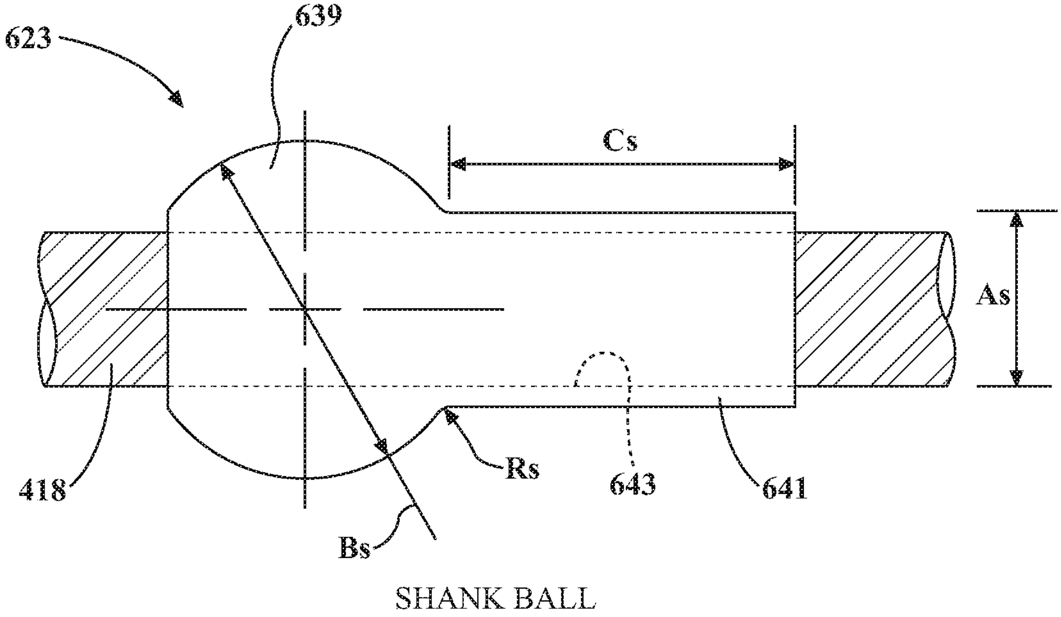
FIG. 8B is a diagram of another suitable head anchor 62*e* shape for the cables 418 in accordance with one or more embodiments.

FIG. 8B is a diagram of another suitable head/anchor 623 shape for the cables 418 in accordance with one or more embodiments. In this embodiment, the engagement profile or head 639 has a diameter Bs and joins the tail 641 at radius Rs. The tail has a length Cs. A channel 643 extends through the head and tail of sufficient diameter As to accommodate a cable 418.

The head shape can be selected to facilitate installation of the cables to the connecting ends, to secure the cables to the ends, and the like.

Figure 9:
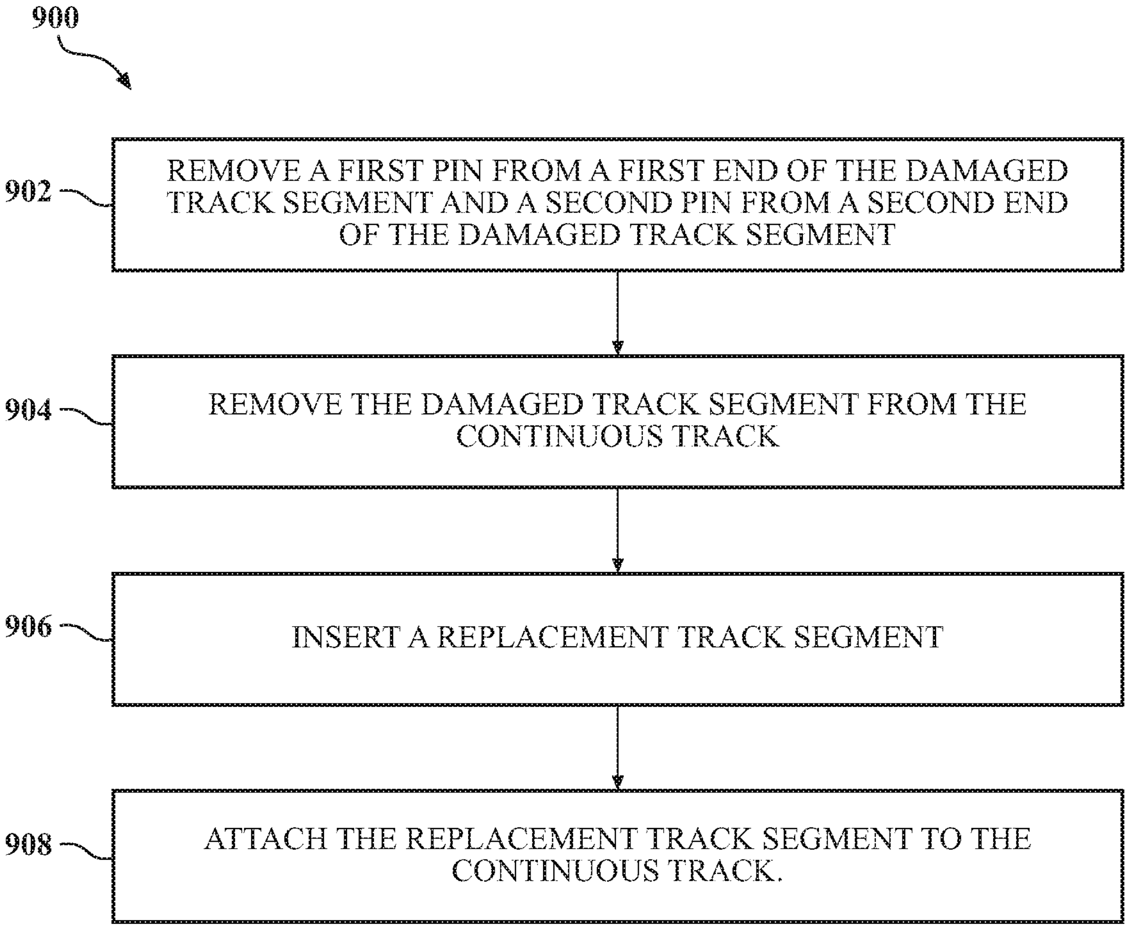
FIG. 9 is a flow diagram illustrating a method 900 of replacing a track segment of a continuous track for a vehicle in accordance with one or more embodiments.

FIG. 9 is a flow diagram illustrating a method 900 of replacing a track segment of a continuous track for a vehicle in accordance with one or more embodiments. The method 900 is provided for illustrative purposes and it is appreciated that the method 900 can omit shown elements and/or include additional elements.

The method 900 can be used with the track segment 100 described above and variations thereof.

The continuous track comprises a plurality of track segments, such as 5 or 6 segments. In another example, the continuous track has two or more track segments.

A first pin from a first end of the damaged track segment and a second pin from a second end of the damaged track segment are removed at 902.

The damaged track segment is removed from the continuous track at 904. The continuous track can remain attached to the vehicle during removal.

A replacement track segment is inserted into the continuous track at 906. Inserting the replacement track comprises aligning sections at ends of the replacement track with sections at ends of the continuous track, such as connecting ends and/or knuckles.

The replacement track segment is attached to the continuous track at 908.

In one variation, the damaged track is identified by failure, wear indicator, temperature and the like.

The cables 418 are shown connecting each end of the segment 100. The holes or insertion points are machined or cast into the steel connector bars.

Figure 10:
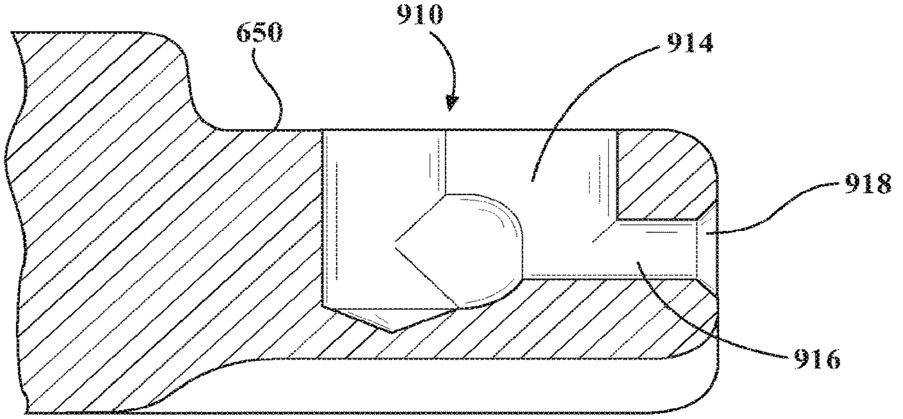
FIG. 10 is a detailed cross section view of a portion of the connecting end showing the insertion point with its chamfered or radiused surface.

One embodiment of the insertion point on the connecting end shown in FIG. 10 allows for easy assembly of various length cables. The connecting end may be machined or drilled with a machined pocket 910 profiled to accommodate insertion of the ferrule on the cable. The machined pocket or insertion point includes an opening 914 wherein the ferrule is pressed and fits into place in the profile insertion point. The insertion point is profiled to accept the specific ferrule on the cable end. A cable passage 916 is radiused or chamfer at 918 so that the cable does not experience stress during track operation where it exits the connecting end. This allows for different length of track assemblies without major design changes to the connecting bars. The machined pockets or insertion points are designed to allow for ease of insertion that provides a positive alignment, correct spacing, and accurate control of overall length of the cables. The cable ferrule is aligned during insertion into the machined pocket or insertion point. The features of the connector bar are contoured to reduce stress on the cable. As previously stated, this could be a radius, or a chamfer 918 as determined to provide the best cable life. The machined pocket or insertion point is designed to allow use of standard drills and machining tools to create the features needed to align and space the cable with the attached ferrule.

Figure 11:
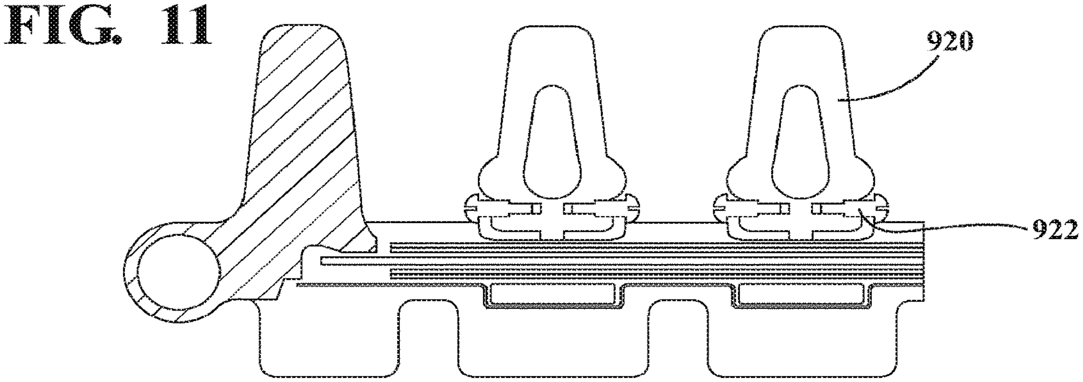
FIG. 11 is a sectional view of the track showing reinforcements for guide lugs.
Figure 12:
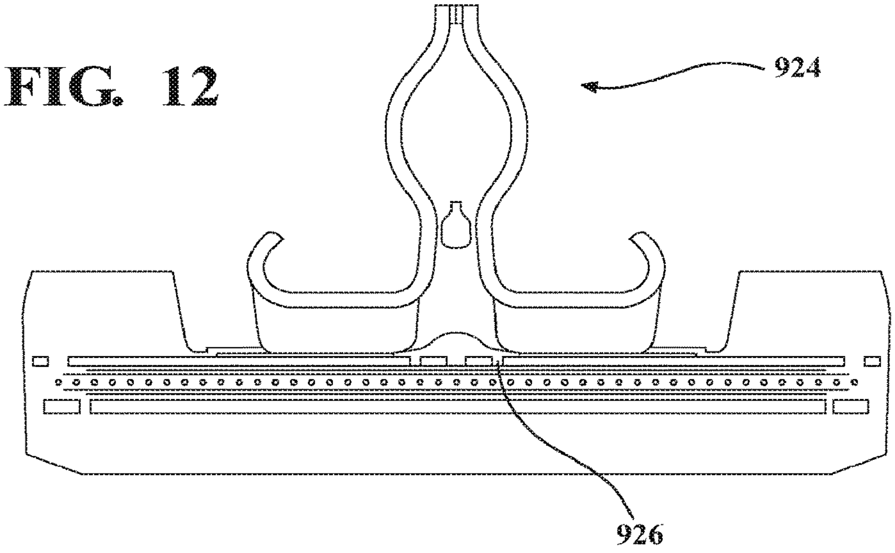
FIG. 12 is a sectional view of the track showing one embodiment of an upper reinforcement that aligns and transfers loads form the upper reinforcement=to the lower reinforcement

Additionally, guide lug reinforcements are inserted into the guide lugs and the band body to laterally reinforce the guide lugs and minimize de-tracking occurrences. Shown in FIG. 11 and FIG. 12 are detail cross sectional detailed views of a sectional composite rubber track. In this case the upper guide lug reinforcement 920 is of multiple pieces and assembled prior to molding of the rubber track segment. By making the guide lug reinforcement of different pieces, each piece can be of the optimum material and properties. The guide lug can be forged, cast or machined and heat treated to provide good wear properties and to provide alignment on the vehicle. Many military vehicles have steel roadwheels with wear surfaces, or aluminum roadwheels with steel wear plates and by using a forged guide lug, vehicle changes from existing steel track can be minimized and still provide a durable guide lug. The lower part 922 of the guide lug reinforcement can be made from a steel stamping in this case and of material properties that allow it to reinforce the guide lug. By extending this stamping out into the wheel path and under the wheels the guide lug reinforcement also provides distribution of the wheel loads. The properties can be designed to allow for strength and flexibility. The upper reinforcements 924 and lower reinforcements 926 could be joined together by many methods, welding, brazing, or in this case mechanical fasteners. By using mechanical fasteners, it is possible to replace damaged guide lugs during operation of the sectional composite rubber track without failure of the entire track. This would allow for field serviceability and improved operational time while saving money in track replacement. FIG. 12 shows that the upper reinforcement has positive features that align and transfer loads from the upper reinforcement to the lower reinforcement. This will allow for optimization of the design of both the upper, lower, and fastener.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

One general aspect includes a track segment for a continuous track. The track segment also includes a connecting end. The track segment also includes a rubber track may include an elastomeric material, the rubber track connected to the connecting end.

Implementations may include one or more of the following features. The track segment may include a second connecting end connected to the rubber track. The knuckle mechanism 111 further may include a hole through which the connecting pin passes. The connecting pin has an octagonal shape configured to facilitate connecting the connecting end with a connecting end of another track segment. The knuckle mechanism 111 includes one or more sections that may include an outer shell, a rubber bushing inside the outer shell and a sleeve inside the rubber bushing. The track segment may include a connecting pin that fits through the one or more sections and against an inner surface of the sleeve. The track segment may include a cap configured to secure the connecting pin to the knuckle mechanism 111. An outer surface of the rubber track may include a tread pattern. An inner surface of the rubber track may include drive lugs. The rubber track may include a plurality of cables each having a head attached within an insertion point of the connecting end. The connecting end may include a plurality of rows of insertion points for connecting the plurality of cables. The rubber track is a composite track and further includes one or more of steel, fabric and/or wire. The connecting end may include a knuckle mechanism 111 through which a connecting pin can be inserted.

One general aspect includes a continuous track for driving a vehicle. The continuous track also includes a plurality of track segments, where each track segment may include a first connecting end, a track segment, and a second connecting end. The continuous track also includes where the plurality of track segments are connected to each other using a plurality of connecting pins. The cables 418 are shown connecting each end of the segment 100. Each connecting end 114, 218 includes a connector bar 650. The holes or insertion points are machined or cast into the connector bars 650.

Implementations may include one or more of the following features. The continuous track where the plurality of track segments are replaceable by removing the plurality of connecting pins. The continuous track, may include tread on an outer surface of the plurality of track segments and drive lugs along an inner surface of the plurality of track segments. The plurality of track segments may include an elastomeric material.

One general aspect includes a method of replacing a damaged track segment from a continuous track of a vehicle. The method also includes removing a first pin from a first end of the damaged track segment and a second pin from a second end of the damaged track segment. The method also includes removing the damaged track segment from the continuous track. The method also includes inserting a replacement track segment. The method also includes attaching the replacement track segment to the continuous track.

Implementations may include one or more of the following features. The method where removing the damaged track further may include leaving the continuous track on the vehicle. Inserting the replacement track may include aligning sections at ends of the replacement track with sections at ends of the continuous track. The continuous track may include at least 5 track segments. The method may include identifying the damaged track segment as damaged.

One general aspect includes a track segment for a continuous track. The track segment also includes a rubber track; and a means for connecting the rubber track to a plurality of additional rubber tracks.

Implementations may include one or more of the following features. The track segment may include a means for connecting cables within the rubber track to a connecting end.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A track segment for a continuous track, the track segment comprising:
 a first connecting end and a second connecting end separated by a rubber track;
 said rubber track including a plurality of cables, each cable arranged parallel to each other and transverse to said connecting ends;
 each said cable having opposed first and second ends, each said cable first and second ends equipped with an anchor secured thereto, each anchor comprising;

an engagement portion extending from a front end toward a tail portion, said engagement portion having a profile with arc portions extending from said front end toward the tail portion;

said tail portion having a tapered end; and each said engagement portion configured to engage a complementary anchor receiving pocket of one of a plurality of insertion points in a connecting bar;

each said connecting end equipped with said connecting bar;

each insertion point comprising a machined pocket configured to receive and connectively engage one of said anchor profiles;

wherein each machined pocket includes a cable passage through which the cable extends from the anchor; said anchor including the profile with arc portions extending from the front end toward the tail portion and further including the engagement portion configured to interact with the insertion point of said connecting bar; and wherein the cable passage is chamfered or radiused at a cable exit region to reduce stress on the cable as the cable flexes during track movement.

2. The track segment of claim 1, further comprising tread on an outer surface of the track segment and drive lugs along an inner surface of said track segment.

3. The track segment of claim 1, wherein the rubber track is a composite track and further includes one or more of steel, or fabric.

4. The track segment of claim 1, wherein one of the connecting ends comprises a knuckle mechanism through which a connecting pin can be inserted.

5. The track segment of claim 4, wherein one of the connecting ends comprises a knuckle mechanism, said knuckle mechanism further comprises a hole through which the connecting pin passes.

6. The track segment of claim 5, wherein the connecting pin has an octagonal shape configured to facilitate connecting one of the connecting ends with a connecting end of another track segment.

7. The track segment of claim 1, wherein one of the connecting ends comprises a knuckle mechanism, the knuckle mechanism includes one or more sections that comprises an outer shell, a rubber bushing inside the outer shell and a sleeve inside the rubber bushing.

8. The track segment of claim 7, further comprising a connecting pin that fits through the one or more sections and against an inner surface of the sleeve.

9. The track segment of claim 8, further comprising a cap configured to secure the connecting pin to the knuckle mechanism.

10. The track segment of claim 1, wherein an outer surface of the rubber track comprises a tread pattern.

11. The track segment of claim 1, wherein an inner surface of the rubber track comprises drive lugs.

12. The track segment of claim 1, wherein each anchor comprises said profile portion with arc portions extending from the front end toward the tail portion, and said engagement portion configured to interact with the insertion points in said connecting bar.

13. The track segment of claim 1, wherein one of the connecting ends comprises a plurality of rows of insertion points for connecting the plurality of cables.

* * * * *